(12) United States Patent
Wang

(10) Patent No.: US 7,741,247 B2
(45) Date of Patent: Jun. 22, 2010

(54) METHODS AND COMPOSITIONS FOR SEALING FRACTURES, VOIDS, AND PORES OF SUBTERRANEAN ROCK FORMATIONS

(76) Inventor: Ling Wang, 7-103 Room No. 8, Xujiabang, Zhongxin Road, Suzhou Industrial Park, Suzhou, Jiangsu (CN) 215021

( * ) Notice: Subject to any disclaimer, the term of this patent is extended or adjusted under 35 U.S.C. 154(b) by 46 days.

(21) Appl. No.: 11/672,104

(22) Filed: Feb. 7, 2007

(65) Prior Publication Data
US 2007/0187099 A1    Aug. 16, 2007

(51) Int. Cl.
*E21B 33/138* (2006.01)
*E21B 21/00* (2006.01)

(52) U.S. Cl. .................. 507/117; 507/112; 507/204; 507/214; 507/219; 166/295; 175/72

(58) Field of Classification Search ............ None
See application file for complete search history.

(56) References Cited

U.S. PATENT DOCUMENTS

| | | | |
|---|---|---|---|
| 4,217,965 A | 8/1980 | Cremeans | |
| 4,289,632 A | 9/1981 | Clear | |
| 4,369,844 A | 1/1983 | Clear | |
| 4,422,948 A | 12/1983 | Corley et al. | |
| 4,425,462 A | 1/1984 | Turner et al. | |
| 4,428,843 A | 1/1984 | Cowan et al. | |
| 4,428,844 A | 1/1984 | Wagener | |
| 4,474,665 A | 10/1984 | Green | |
| 4,498,995 A | 2/1985 | Gockel | |
| 4,664,816 A | 5/1987 | Walker | |
| 4,704,213 A | 11/1987 | Delhommer et al. | |
| 4,862,975 A | 9/1989 | Maillet et al. | |
| 4,957,174 A | 9/1990 | Whitfill et al. | |
| 4,966,237 A * | 10/1990 | Swanson et al. ............ 166/292 |
| 5,065,820 A | 11/1991 | Bloys et al. | |
| 5,071,575 A | 12/1991 | House et al. | |
| 5,076,944 A | 12/1991 | Cowan et al. | |
| 5,332,724 A | 7/1994 | Burts, Jr. | |
| 5,599,776 A | 2/1997 | Burts, Jr. | |
| 5,688,844 A * | 11/1997 | Chatterji et al. ................ 524/8 |
| 5,806,592 A | 9/1998 | Forrest | |
| 5,826,669 A | 10/1998 | Zaleski et al. | |
| 5,861,362 A | 1/1999 | Mayeux et al. | |

(Continued)

OTHER PUBLICATIONS

PCT International Search Report and Written Opinion, dated Dec. 6, 2007, for application No. PCT/US07/03149.

*Primary Examiner*—James Seidleck
*Assistant Examiner*—John J Figueroa
(74) *Attorney, Agent, or Firm*—Kenneth L. Nash

(57) ABSTRACT

A region of a borehole with one or more openings to be sealed off, such as one or more fractures, voids, and or pores, may or may not be sealed off around a tubular string with a borehole seal such as a packer or plug. A carrying fluid may be utilized to transport a filtration material into the opening to create a bridge, which at least partially seals the opening, but still provides a flow path that permits fluid flow therethrough. A solid material and/or settable material may then utilize the fluid flow subsequently or be simultaneously spotted with or behind the filtration material to thereby form compositions which effectively seals off the flow path into the one or more openings.

19 Claims, 1 Drawing Sheet

U.S. PATENT DOCUMENTS

| | | |
|---|---|---|
| 6,016,879 A | 1/2000 | Burts, Jr. |
| 6,518,224 B2 | 2/2003 | Wood |
| 6,581,701 B2 | 6/2003 | Heying |
| 6,630,429 B1 | 10/2003 | Cremeans et al. |
| 6,722,433 B2 * | 4/2004 | Brothers et al. ............ 166/288 |
| 6,739,414 B2 | 5/2004 | Brookey et al. |
| 6,806,232 B1 | 10/2004 | Cart |
| 7,213,647 B2 * | 5/2007 | Brothers et al. ............ 166/288 |
| 2005/0072599 A1 | 4/2005 | Luke |
| 2006/0000611 A1 | 1/2006 | Reddy et al. |

* cited by examiner

METHODS AND COMPOSITIONS FOR SEALING FRACTURES, VOIDS, AND PORES OF SUBTERRANEAN ROCK FORMATIONS

BACKGROUND OF THE INVENTION

1. Field of the Invention

The present invention relates generally to drilling oil or gas wells and more particularly to methods and compositions for sealing fractures, voids, and pores of subterranean formations.

2. Description of the Background

During drilling or completion, a bore hole may leak bore hole fluids at a certain pressure level into openings such as a fracture, void or pore connected to the bore hole. These openings are formed either by naturally existing faults, fissures, fractures, voids or vugs penetrated by the wellbore or by fractures artificially induced by abnormally wellbore pressure. Drilling fluids are generally very expensive and it is desirable that the fluids not be lost within "lost circulation zones." Moreover, circulation of fluids through the borehole is important for most drilling operations for many reasons, as is well known to those of skill in the art. Therefore, sealing the fracture, void or pore is necessary for rig operations to proceed.

In the past, fibrous, pelleted and particulate lost circulation materials have been used to form the needed seal in the borehole. For instance, fibers, almond shell, graphite, peanut hull, cotton burrs, oat hulls, and ground marble are all used for sealing fractures, voids and pores. However, these materials may not always form a reliable seal due to a wide range of different downhole conditions.

Consequently, there remains a long felt need for improved methods and compositions to prevent or reduce lost circulation problems. Because those skilled in the art have recognized and attempted to solve these problems in the past without reliable success, they will appreciate the present invention, which addresses these and other problems.

SUMMARY OF THE INVENTION

It is an object of the present invention to provide improved methods for sealing lost circulation zones.

It is another object of the present invention to provide new compositions for sealing openings such as fractures, voids, pores or vugs within a subterranean formation.

These and other objects, features, and advantages of the present invention will become apparent from the drawings, the descriptions given herein, and the appended claims. However, it will be understood that the above-listed objectives and/or advantages of the invention are intended only as an aid in quickly understanding aspects of the invention, are not intended to limit the invention in any way, and therefore do not form a comprehensive or restrictive list of objectives, and/or features, and/or advantages.

Accordingly, the present invention provides a composition that can be used to seal one or more subterranean openings in a borehole. In one embodiment, the composition may comprise a filtration material which provides a plurality of fluid flow paths through the filtration material, a solid material to block the fluid flow paths, and at least one carrying fluid for carrying therewith at least one of the filtration material or the solid material into the one or more subterranean openings of the bore hole.

In one embodiment, the filtration material may comprise a multitude of foam rubber elements. The foam rubber elements may comprise a plurality of cells that permit fluid flow therethrough and define the plurality of fluid flow paths through the filtration material. The multitude of foam rubber elements may be elastic to compress and expand to thereby conform to any subterranean openings. In one embodiment, at least 5% of the cells may be interconnected with a plurality of connection channels wherein a connection channel diameter is larger than 0.01 millimeters.

In one embodiment, the filtration material may be flexible. Larger sizes of the filtration material are needed to build filtration mechanism inside larger voids. However the size of the filtration material can be limited by flow restrictions from such as piping, bottom hole assemblies, bit nozzles through which the filtration material is delivered to the subterranean openings. A flexible filtration material can allow larger sizes of the filtration material pumped through piping, bottom hole assemblies and bit nozzles and get into said one or more subterranean openings including those with smaller sizes than the filtration material. With larger size and flexible filtration material, it is more likely to form a thick strong seal inside voids by forming a filtration mechanism or a filtration bridge inside voids first by allowing a larger accumulation of the filtration material before the deposition of the elements of a solid material behind the filtration bridge to form the seal.

The preferred connection channel diameter is relative to the size of the solid material elements which should be larger than the connection channel diameter in general. The carrying fluid should flow through the filtration material freely in order to favor the accumulation of the filtration material inside the voids. The carrying fluid may have fine solid particles to provide enough viscosity and suspension capacity. For example, one of the carrying fluids can be a drilling fluid in the wellbore. A drilling fluid can have clay particles of a size of 0.51~5 micrometers in general. If this drilling fluid is used as the carrying fluid, the preferred filtration material should have connection channel diameters of larger than 10 micrometers to ensure the drilling fluid can flow through the connection channels.

The preferred connection channel diameter can be much larger than the required particle size of the carrying fluid. For example, when a drilling fluid with clay particles of 0.5~5 micrometers is used as the carrying fluid, the connection channel diameter can be 50~250 micrometers to ensure a free flow through the filtration material. In this case, the solid material to block the passage to form the seal should at least have some particle of size of more than 50~250 micrometers. The solid material is preferred to have a wide distribution of particle size to block the connection channel and the voids between the filtration and/or solid material elements. For example, for blocking the connection channel of 50~250 micrometers, the solid material elements can have a size distribution of 0.1~500 micrometers.

The solid material may or may not comprise a settable material. The at least one carrying fluid may or may not comprise a settable material. In one possible embodiment, the filtration material might comprise at least one of a group consisting of sponge, foam rubber, cellulose sponge, fiber pads, open cell polymer foam and open cell foam rubber.

The present invention provides a method for sealing one or more subterranean openings in a borehole that may comprise one or more steps such as, for example only, forming an initial filter bridge within the one or more subterranean openings by pumping a carrying fluid carrying a plurality of filtration elements into the one or more subterranean openings. The initial filter bridge defines a plurality of flow passages therethrough that permit at least some fluid flow therethrough but also restricts fluid flow through the one or more subterranean openings. Other steps might comprise positioning solid material into the one or more subterranean openings to encounter the plurality of flow passages within the plurality of filtration elements and seal the one or more subterranean openings.

The step of positioning solid material into any subterranean openings may comprise pumping a plurality of solid elements that are sized to be larger than the plurality of flow passages to block fluid flow through the plurality of filtration elements. Alternatively or additionally, the step of positioning solid material into the one or more subterranean openings may comprise pumping a settable fluid into the plurality of flow passages to set and thereby block fluid flow through the one or more passages.

In one embodiment, the method may further comprise providing that the individual filtration elements comprises a foam material. The foam material may further comprise a plurality of internal cells and interconnections such that at least some of the plurality of internal cells are interconnected to each other and at least some of internal cells are interconnected to an outer surface of the individual filtration element. In one embodiment, the foam material is compressible to conform to a shape of any subterranean openings.

In another embodiment, the plurality of filtration elements are rigid, but comprise a multitude of filtration elements that are small compared to the one or more subterranean openings to conform to a shape of the openings.

The method may further comprise first pumping the plurality of filtration elements into the one or more subterranean openings and then subsequently positioning solid material into the one or more subterranean openings. Alternatively, the method may further comprise simultaneously pumping the plurality of filtration elements and solid material into the one or more subterranean openings. In yet another embodiment, the plurality of filtration elements are in a drilling fluid utilized during drilling such that when the one or more subterranean openings are encountered during drilling that the initial filter bridge is formed.

In yet another embodiment, a composition may comprise a foam filtration material with one or more fluid flow paths therethrough to permit fluid flow through the foam filtration material, and at least one carrying fluid for carrying therewith the foam filtration material into the one or more subterranean openings in the borehole. The composition may further comprise a solid material. Where utilized, the solid material may comprise solid particulates sized to seal off the one or more fluid flow paths. The at least one carrying fluid may or may not be a settable fluid.

In one possible embodiment, the invention may comprise a composition that can be used to seal a fracture, void, vug, or pore within a well bore. The composition may comprise elements such as a filtration material, which may be a cellular, rigid or flexible, material and a carrying fluid utilized to place the filtration and solid material within the opening, such as one or more fractures, voids, vugs, or pores for effecting a seal. In one possible preferred embodiment, the filtration material may be comprised of a multitude of small elastic elements containing cells wherein at least some of the cells are interconnected.

In another possible embodiment, the invention may comprise yet other new compositions used to seal an opening such as a fracture, void, vug, or pore, such as, for instance, a filtration material, e.g., a cellular material, a settable material and a carrying fluid.

In another possible embodiment of the invention, a method is provided wherein the filtration material is pumped ahead of the solid material by utilizing carrying fluid. In another embodiment, the filtration material may be mixed together with the solid material and the carrying fluid.

In another possible embodiment of the invention, the carrying fluid can be the settable material before it sets up.

While the present invention will be described in connection with presently preferred embodiments, it will be understood that it is not intended to limit the invention to those embodiments. On the contrary, it is intended to cover all alternatives, modifications, and equivalents included within the spirit of the invention.

DESCRIPTION OF PRESENTLY PREFERRED EMBODIMENTS

Figure 1:
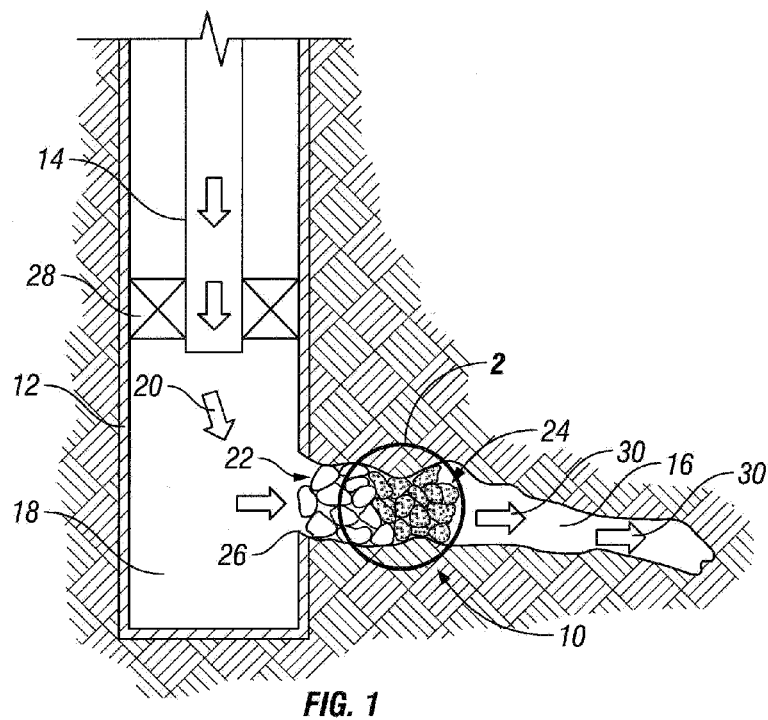
FIG. 1 is a side elevational view schematic, in cross-section, of a well bore wherein a subterranean fracture is sealed off utilizing a carrying fluid with filtration material to bridge off the flow path to create a filtration mechanism and subsequently positioning solid material behind the bridge to seal the flow path in accord with one possible embodiment of the present invention.

Referring now to FIG. 1, one possible embodiment of sealing composition 10 of the present invention is illustrated. Borehole 12 may or may not be sealed off around drill string 14 above subterranean opening 26 in borehole 12, such as one or more fractures, voids, vugs, and/or pores. If utilized, borehole seal 28 may comprise a drillable packer, an interval sealed off by packers and/or plugs, or other suitable means.

Carrying fluid as indicated by arrows 30 may be utilized to transport filtration material 24, as described hereinafter, into opening 26. This creates a filtration mechanism or a bridge which partially seals opening 26, but which still permits flow of carrying fluid 30 through filtration material 24 itself. Solid material 22, as described hereinafter, is then subsequently or simultaneously spotted with or behind filtration material 24 to accumulate behind the bridge and thereby seal off the flow path through opening 26 to form seal or sealing composition 10. Solid material 22 may be small solid elements and/or particulates, which individually are solid in the sense that fluid does not pass through each small solid element. The solid material may or may not be rigid and may change in state to provide a fluid blocking function to produce a seal.

If deemed necessary, settable material such as cement or resin may be pumped after solid material 22 and/or in one embodiment may be utilized in place of it, either after or in conjunction with the filtration material. Accordingly, item 22 may refer to solid material and/or setting material that hardens into solid material 22. The composition may be pumped into the borehole under suitable pressures and in quantities determined necessary for effecting a seal.

In one embodiment, a composition that can be used to seal the fracture, void or pore comprises (1) filtration material 24 such as a cellular material, (2) solid material 22, and (3) carrying fluid 30. In another embodiment, a composition that can be used to seal the fracture, void or pore comprises (1) filtration material 24, (2) carrying fluid 30, and/or (3) a settable material.

In another embodiment, a method is provided comprising pumping filtration material 24 to effect a bridge in subterranean opening 26, then either subsequently or simultaneously pumping solid material 22 into opening 26. Filtration material 24 may be carried into the opening by pumping it along with carrying fluid 30. Filtration material 24 may be flexible to fit into opening 26 and resilient enough to enlarge once in the opening, and after the pump is shut in.

In another embodiment, a composition that can be used to seal the fracture, void or pore comprises (1) a cellular filtration material 24, (2) a carrying fluid 30, and (3) a settable material.

In another embodiment, a method is provided comprising pumping porous material to effect a bridge in a subterranean opening, then either subsequently or simultaneously pumping a solid material 22. The cellular filtration material 24 may be carried into the opening 26 by pumping it along with a carrying fluid 30. The cellular filtration material 24 may be flexible to fit into the opening 26 and resilient to enlarge once in the opening 26 and after the pump is shut in.

Filtration material 24, such as cellular material, may also be expandable when used with or engaged with other fluids such as water or the like. For instance, filtration material 24 may be pumped with a carrying fluid 30 that does not cause expansion and then contacted with another fluid for effecting expansion of filtration material 24 and/or for cementing the expanded filtration material 24 in position. In another embodiment filtration material 24 may slowly expand so that it does not expand until after it has been pumped and spotted, and perhaps after the pump is stopped to release the pump pressure.

Figure 2:
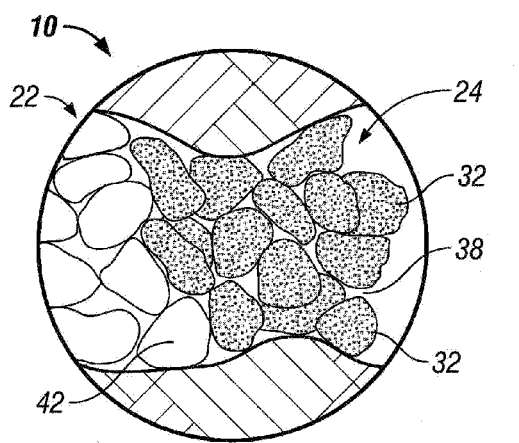
FIG. 2 is an enlarged view of a seal created with the composition of the present invention.

Typically, a volume comprising a plurality or multitude of filtration elements 32 that form filtration material 24 as shown enlarged in FIG. 2, may be pumped into the well bore. In one possible preferred embodiment, it is actually only necessary that small pieces of any shape, including random shapes, are utilized. However, it is conceivable that a single or relatively few larger size filtration elements 32 that form filtration material 24 may be pumped into larger voids in accord with the process of the invention. The shape of filtration elements 32 may be less important when many small filtration elements 32 are used and/or filtration elements 32 are highly resilient, as compared to when fewer but larger filtration elements 32 are utilized.

However, the shape of individual, small, rigid, filtration elements 32 may also be utilized to affect the overall porosity and permeability of the resulting filtration material 24. For instance, rigid circular or ball-shaped filtration elements 32 tend to maximize the spacing between the filtration elements 32. Shapes that fit closely together such as cubed shapes or shapes with flat walls tends to minimize the spacing between the filtration elements 32. The shape of filtration elements 32 generally may be irregular, cubed, pelleted, spherical, elliptic or granular.

Figure 3:
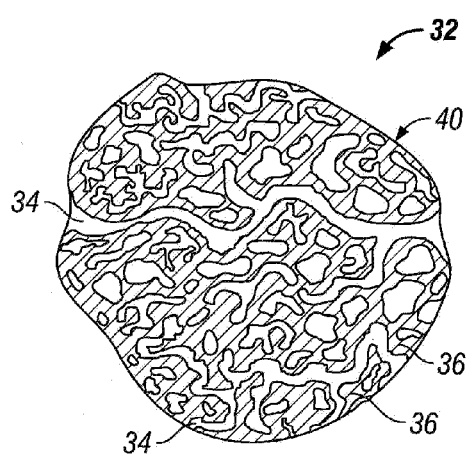
FIG. 3 is a schematic or conceptual view of an individual cellular element that may be utilized as the filtration material.

Filtration elements 32 may comprise a rigid material that may typically have a size of from 0.3 millimeter to 50 centimeters, although filtration elements 32 are not limited to this range. Filtration elements 32 may be elastic and flexible but could also be rigid. As illustrated in concept in FIG. 3, filtration elements 32 may in one embodiment preferably comprise pores or cells 34 that are interconnected and open to an external surface. Thus, carrying fluid 30 may flow through filtration material 24, even when filtration material 24 is essentially prevented from movement due to encountering a wall of the void, fracture, or the like. Filtration material 24 creates a filtration mechanism that preferably only allows carrying fluid 30 to pass easily, but not the solids that accumulate behind filtration material 24 and seals off the voids. The average pore or cell size of pores or cells 34 in filtration elements 32 range from 10 micrometers to 5 centimeters.

As discussed above, any spaces 38 formed between filtration elements 32 in filtration material 24 affect overall permeability of filtration material 24. Thus, round porous elements create significantly sized spaces 38 and, therefore, affect the overall porosity of filtration material 24.

Filtration material 24 may comprise foam rubber, clustered entangled fibers and sponge. In one embodiment, filtration material 24 preferably is an open-cell foam rubber or sponge. Other materials that may also work include entangled fiber clutters, or fiber pad fragments.

Foam may refer to any of various light, porous, semi-rigid or spongy materials used or thermal insulation or shock absorption, as in packing. Foam material contains bubbles and may comprise rubber, plastic, or other material filled with many small bubbles (pores or cells) of air or gas to make it soft or light. Thus, foam comprises a material in a lightweight cellular form resulting from introducing of gas bubbles during manufacture. Foam rubber in particular comprises rubber that has been aerated to form a spongy material as might generally be used in mattresses, padding, or insulation. Foam rubber may sometimes be called foam, foam sponge rubber, or sponge rubber (which may tend to have larger cells or pores). In addition, foam may be formed by polymers other than latex. The foam may be compressed or uncompressed.

Thus, the invention may comprise a foam material for filtration material 24, a solid particulate for solid material 22, and at least one but possibly more carrying fluids 30.

It would be possible that solid material 22 could be a closed cell foam material. As discussed herein, the carrying fluid for filtration material 24 and/or solid material 22 may be a settable fluid.

Some of the various embodiments of the invention utilizing foam as filtration material 24 might comprise:

1) foam+solid material+carrying fluid 2) foam+solid material+settable fluid 3) foam+solid material+carrying fluid+settable fluid 4) foam+carrying fluid+settable fluid 5) foam+carrying fluid 6) foam+settable fluid Foam and solid materials 22 may be mixed together then carried by carrying fluid 30, or solid materials 22 may be spotted or injected after the foam is spotted or injected. Accordingly, foam can mix with the settable fluid or carried by carrying fluid 30, followed by a settable fluid.

The concentration of filtration material 24 may range from 0.001 to 1000 pound per barrel of carrying fluid 30. Examples for the filtration material 24 include, but are not limited to, sponge, foam rubber, cellulose sponge, clustered entangled fibers, fragmented fiber pads, open cell polymer foam and/or open cell foam rubber.

The majority of pores or cells 34 in filtration material 24, in one preferred embodiment, may be visible to a naked eye. Average pore size may range from 0.01 millimeters to 5 centimeters. One preferred range of the average pore size is from 0.1 millimeters to 5 millimeters. More than one pore is preferably contained in each individual filtration element 32 and the pores may preferably be relatively evenly distributed throughout the material. It is not necessary that all pores be interconnected.

However, in one preferred embodiment, at least 5% of the pores or cells 34 are interconnected with connection channel 36 that preferably has a diameter larger than 0.01 millimeters. In another embodiment, less than 50% of the cells are interconnected. In another embodiment, between 5% and 75% of the pores or cells 34 are interconnected.

In one preferred embodiment of the invention, filtration elements 32 are elastic or resilient. Filtration elements 32 may in one embodiment typically have a Young's Modulus smaller than 100,000 psi.

In one preferred embodiment of the invention, filtration elements 32 are flexible.

In one preferred embodiment of the invention, filtration elements 32 are rigid.

Websites for engineering specifications for foams and foam materials may be utilized to determine specifics for the filtration material 24 such as http://foam-materials.globalspec.com/Specifications/Materials_Chemicals_Adhesives/Composites_Textiles_Reinforcements/Foams_Foam_Materials. A definition for foam rubber as used for filtration material 24 in accord with the present invention may comprise a lightweight rubber that has a great amount of trapped air in the bubbles within the material. This treated rubber forms a firm, spongy foam that is used in seats, mattresses, etc. See for instance, www.peakagents.ca/glossary/f11.htm. Filtration elements 32 may comprise spongy rubber, which may be made by introducing air bubbles before vulcanization and used for cushioning or upholstery. See the definition of foam rubber, for instance, at wordnet.princeton.edu/perl/webwn. For use as filtration elements 32, the spongy rubber has interconnections or connection channels 36 to surface 40 of each filtration element 32 and interconnections or connection channels 36 between the pores of the sponge.

In one preferred embodiment, filtration elements 32 have elasticity or the ability of a material to return to its original shape when load-causing deformation is removed.

Individual elements 42 of solid material 22 can be a particulate, pelleted, fibrous material or their combination. Once positioned in opening 26, solid material 22 is not deemed permeable to carrying fluid 30, or the wellbore fluids such as drilling fluids or completion fluids to pass through, so that it can form a seal when enough accumulates. At least some of the solid material 22 individual elements 42 have a larger size than the cells and/or the cell interconnections or connection channels 36 in the filtration material 24, so that the filtration material 24 prevents this material from passing therethrough. The solid material 22 can also contain elements that have a much smaller size than the pores or interconnections or connection channels 36. These smaller elements can block the smaller pore spaces formed by the larger elements. It is preferable to have wide distribution of the size of the elements of the solid material 22 in order to form a good seal or sealing composition 10 behind the bridge. The solid material 22 may comprise the filtration material 24 itself, because the pores of filtration material 24 can be collapsed under loading down hole. Solid material 22 may also comprise drilled solids, particulates, weighting materials such as barite and hematite, drilled cuttings, added lost circulation materials and any other solids that cannot pass through filtration material 24 or the bridge formed. The concentration of the solid material 22 may range from 0.0001 to 1500 pound per barrel of carrying fluid 30. The total amount of solid material 22 has to be enough to form the seal.

Examples for solid material 22 may include, but are not limited to, calcium carbonate particulates, weighting materials such as barite and hematite, drilled solids such as drilled cuttings, glass beads, ground glass beads, sand, diatomaceous earth, perlite, mica, cellophane flakes, cement, bentonite, kaolinite, ground walnut hulls, ground cottonseed hulls, fiber, shredded paper, ground coconut shells, petroleum coke, ground corn cob outers, rice fraction, crumb rubber, oil or water absorbing solids, expandable solids, clay, ground peanut hulls, particulate graphite and particulate resilient graphite.

In another embodiment, solid material 22 may comprise a settable material that becomes a solid after setting, but may flow into borehole 12 as a liquid. In another embodiment, a liquid settable material, as discussed below, may be utilized as carrying fluid 30 for the filtration material 24. In another embodiment, a settable material may be utilized along with filtration material 24 and solid material 22 and/or may also be utilized as carrying fluid 30 for one or both of these materials.

Carrying fluid 30 can be a drilling fluid, completion fluid, water, cement slurries, spacer fluids or oil. Carrying fluid 30 can be different for filtration material 24 and solid material 22. The volume of carrying fluid 30 can be from 0.01 barrel to 100 million barrels, or as required. Non-limiting examples for the carrying fluid 30 include but are not limited to drilling fluids, completion fluids, water, brine, oil, diesel, synthetic oil, any organic liquid, water based drilling fluids, oil based drilling fluids, and/or synthetic based drilling fluids, spacer fluids, cement slurries.

Although the present invention may operate in different ways, operation considerations of one possible embodiment include the following: Filtration material 24 has less flow resistance to carrying fluid 30 than solid material 22 at the same conditions. Thus, the viscosity of carrying fluid 30 and the average pore size and interconnection size and openings 26 to the surface of filtration elements 32 and spaces 38 permit flow of carrying fluid 30 to continue therethrough, even after filtration material 24 accumulates. As filtration material 24 is swept along in the current of carrying fluid 30, it has a higher tendency to accumulate within the void or opening 26 to be sealed. Filtration material 24 may accumulate to the same size as, or expand slightly over the size of, the openings 26 of the original fracture, void or vug. Flexibility or elasticity of the filtration elements 32 can ensure that the filtration elements 32 can be carried into even portions of opening 26 that are smaller than the size of filtration elements 32. The filtration elements 32 can further be expandable to allow better engaging the sides of a fracture, void or pore to form the filter bridge. The filtration elements 32 can further be compressed filtration materials to allow expansion inside a fracture, void or pore for better engaging the sides of a fracture, void or pore to form the filter bridge. Filtration elements 32 once carried into a fracture, void or pore by the carrying fluid 30 tend to engage the sides of the fracture, void or pore to form clumps which then grow as more filtration elements 32 arrive to form a bridge inside the fracture, void or vug. The formed bridge creates a filtration mechanism that will let at least some of the carrying fluid 30 flow through filtration material 24, but will effectively not allow solid material 22 to flow through filtration material 24. Some solid material 22 might initially flow through the channels 34 and spacing 38 in filtration elements 32. However, due to the flow of carrying fluid 30, solid material 22 will flow towards, accumulate, and block channels 34 and spacing 38, thereby preventing fluid flow of well bore fluids. During pumping of filtration material 24, the pump pressure at the surface may increase as bridging occurs. When enough of solid material 22 has accumulated behind the bridge, seal 10, or at least an initial seal 10, is formed. Filtration material 24 restricts fluid flow and solid material 22 seals off even this flow to form seal 10.

A preferred sequence of events may comprise pumping filtration material 24 ahead of solid material 22. However, filtration material 24 may also be mixed together with solid material 22, prior to or during pumping, if desired.

Another embodiment of the present invention is another new composition that can be used to seal the fracture, void or pore, which may also comprise filtration material 24, carrying fluid 30, and a settable material. In this embodiment, filtration material 24 and carrying fluid 30 may be the same as previously discussed. The settable material is initially a fluid or slurry, but sets to form solid material 22 after a period. Settable material may comprise Portland cement and cross-linking polymers. In the settable material, if desired, solid material 22 can also be added to ensure that the settable material would be kept behind the formed bridge. In operation, the porous material has less flow resistance to the carrying fluid 30 than a solid material 22 at the same conditions and, therefore, it has a higher tendency to accumulate, while fluid flows thereby. Filtration material 24 accumulates to a size close to or over that of the openings 26 of the fracture, void or vug. Flexibility or elasticity of filtration material 24 can ensure that filtration material 24 can be carried into an opening 26 or portions of opening 26, smaller than the size of filtration material 24. Similarly, filtration material 24 carried into a fracture, void or pore by carrying fluid 30 tends to form a bridge inside the fracture, void or pore to create seal 10. The initially formed bridge creates a barrier that will let carrying fluid 30 pass relatively easily, but not necessarily the settable material. Thus, the average pore size of the filtration material 24 may be selected in conjunction with the viscosity of the settable material such that the settable material is positioned at least largely inside of filtration material 24. In this way, filtration material 24 can keep the settable material in place until it sets. Once the settable material sets and forms solid material 22, then settable material can be drilled out of the borehole while filtration material 24 and remaining excess settable material composition seals off the voids, fractures, pore, and the like.

In another embodiment, filtration material 24 and settable material and/or solid material 22 is mixed either completely or to some degree either above the surface or in the well bore. After pumping the settable material, the elasticity of filtration material 24 expands within the void, and the settable material then sets to form a composition that fills the void or opening 26.

In yet another embodiment, the method comprise drilling with a self-sealing drilling fluid loaded with foam rubber elements to seal immediately when lost circulation zones are encountered during drilling, thereby preventing the many problems that can occur due to this, e.g. blowouts and loss of expensive drilling fluids. In this case, foam or foam plus solid materials 22 may be used in the drilling fluids and the drilling or completion fluids will be the carrying fluid 30.

Fibers, almond shell, graphite, peanut hulls, cotton burrs, oat hulls, and ground marble have all been used for sealing fractures, voids and pores. However, filtration material 24 composition of the present invention as discussed above has a better capability for forming a seal or sealing composition 10, especially when it is used together with solid material 22 and/or the settable material. Thus, the present invention comprises methods and compositions for sealing fractures, voids, and/or vugs of subterranean rock formations.

Accordingly, the foregoing disclosure and description of the invention is illustrative and explanatory thereof, and it will be appreciated by those skilled in the art, that various changes in the ordering of steps, ranges, materials, and/or attributes and parameters related to the materials, as well as in the details of the illustrations or combinations of features of the methods and apparatus discussed herein, may be made without departing from the spirit of the invention

What is claimed is:

1. A composition that can be used to seal one or more subterranean openings in a bore hole, comprising:
   a filtration material comprised of a plurality of individually permeable elements that provides a plurality of fluid flow paths through said filtration material;
   a solid material to block said plurality of fluid flow paths; and
   at least one carrying fluid for carrying therewith at least one of said filtration material or said solid material into said one or more subterranean openings of said borehole, wherein said filtration material is operable for pumping to said one or more subterranean openings with both a water-based carrying fluid and with an oil-based carrying fluid, and wherein said solid material comprises solid particulates sized to seal off said one or more fluid flow paths so as to be operable to accumulate substantially on one side of said filtration material.

2. The composition of claim 1 wherein said plurality of individually permeable elements comprises a multitude of foam rubber elements, said foam rubber elements comprising a plurality of cells that permit fluid flow therethrough and define said plurality of fluid flow paths through said filtration material.

3. The composition of claim 2 wherein said multitude of foam rubber elements are elastic to be operable to compress and subsequently enlarge, to thereby conform to said one or more subterranean openings.

4. The composition of claim 3 wherein said plurality of said fluid flow paths are formed by at least 5% of said cells being interconnected with a plurality of connection channels wherein an average of a connection channel diameter is larger than 0.01 millimeters.

5. The composition of claim 1 wherein said solid material comprises a settable material.

6. The composition of claim 1 wherein said filtration material comprises any one or more of a group consisting of sponge, foam rubber, cellulose sponge, fiber pads, clustered entangled fibers, open cell polymer foam and open cell foam rubber.

7. The composition of claim 1 wherein said carrying fluid comprises a settable material.

8. A composition that can be used to seal one or more subterranean openings in a bore hole, comprising:
   a foam filtration material comprising a plurality of individually permeable elements with one or more fluid flow paths therethrough to permit fluid flow through said foam filtration material; and
   at least one carrying fluid for carrying therewith said foam filtration material into said one or more subterranean openings in said borehole, wherein said foam filtration material is operable for pumping to said one or more subterranean openings with both a water-based carrying fluid and with an oil-based carrying fluid, and wherein the composition further comprises a solid material operable to be separately carried by the carrying fluid and that comprises solid particulates sized to seal off said fluid flow paths so as to be operable to accumulate substantially on one side of said foam filtration material.

9. The composition of claim 8 wherein said at least one carrying fluid is a settable fluid.

10. The composition of claim 8 wherein said plurality of individually permeable elements comprises a multitude of foam rubber elements, said foam rubber elements comprising a plurality of cells that permit fluid flow therethrough and define said plurality of fluid flow paths through said filtration material, said plurality of said fluid flow paths being formed by at least 5% of said cells being interconnected with a plurality of connection channels wherein an average of a connection channel diameter is larger than 0.01 millimeters.

11. The composition of claim 1 wherein said filtration material is a non-expanding filtration material.

12. The composition of claim 1 wherein said filtration material is non-precompressed.

13. The composition of claim 1, comprising a carrying fluid for said filtration material, said carrying fluid comprising water.

14. The composition of claim 1, wherein said filtration material is operable said filtration material being operable for use with both a water based carrying fluid and an oil-based carrying fluids.

15. The composition of claim 1, wherein said filtration material comprises a rigid material that does not change shape after being pumped into said one or more subterranean openings.

16. The composition of claim 8 wherein said filtration material is a non-expanding filtration material.

17. The composition of claim 8, comprising a carrying fluid for said filtration material, said carrying fluid comprising water.

18. The composition of claim 8, wherein said filtration material is a rigid material.

19. A composition that can be used to seal one or more subterranean openings in a bore hole, comprising:
   a filtration material that provides a plurality of fluid flow paths through said filtration material to permit fluid flow through said filtration material;
   a solid material to block said plurality fluid flow pats; and
   at least one carrying fluid for carrying therewith said filtration material into said one or more subterranean openings in said bore hole, said filtration material being operable for pumping to said one or more subterranean openings with both a water based carrying fluid and with an oil-based carrying fluid, and whereby said filtration material is selected to be operable to limit fluid flow but not prevent fluid flow therethrough when positioned in said one or more subterranean openings, said solid material being sized to block said plurality of fluid flow paths so as to be operable to accumulate substantially on one side of said filtration material.

* * * * *